Oct. 18, 1955
T. P. PAJAK
2,720,948
HONEYCOMB PANEL CONSTRUCTED FOR BOLTING OR
RIVETING TO FRAMEWORK OR ANOTHER PANEL
Filed March 4, 1950
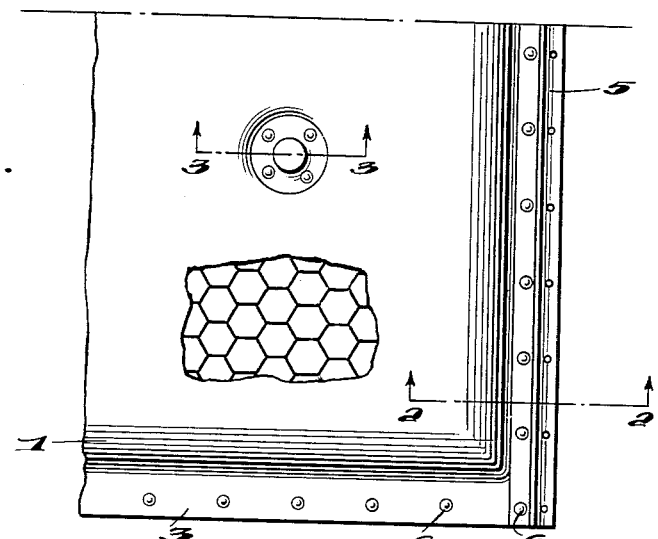
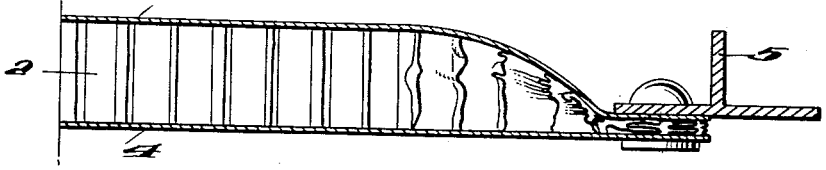
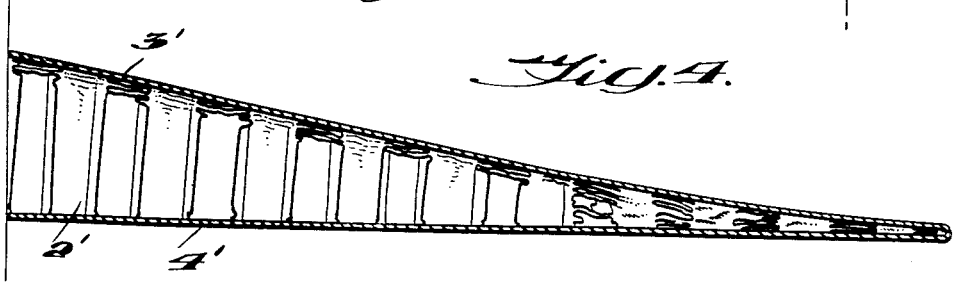
INVENTOR.
THEODORE P. PAJAK,
BY
ATTORNEYS

United States Patent Office 2,720,948
Patented Oct. 18, 1955

2,720,948

HONEYCOMB PANEL CONSTRUCTED FOR BOLTING OR RIVETING TO FRAMEWORK OR ANOTHER PANEL

Theodore P. Pajak, Baltimore, Md., assignor to The Glenn L. Martin Company, Middle River, Md., a corporation of Maryland Application March 4, 1950, Serial No. 147,596

6 Claims. (Cl. 189—34)

This invention relates to honeycomb sandwich panel structures whereby the shape and compressive strength thereof may be locally varied for adapting the panel to meet special requirements.

A major problem confronted in applying honeycomb construction to practical uses arises when such a structure is bolted or riveted to framework or to another panel. Since the local compressive strength of the honeycomb core is not sufficiently high to prevent failure by crushing, due to compressive loads applied by rivets or bolts, the structure has heretofore been limited to only a few applications. The greater theoretical efficiency of this more modern type of structural design has aroused considerable interest, particularly with reference to its practical design limitations. A great amount of effort has been expended in experimenting with honeycomb construction in an attempt to find useful and practical methods of forming which will eliminate its weaknesses and yet retain its desirable characteristics.

Various methods for locally strengthening sandwich structures have been proposed, such as replacing the low density core in the critical areas with a filler much stronger in compression which could withstand the localized forces. This method has obvious disadvantages, one of which is that the filler and the low density core are discontinuous. Such discontinuities seriously hinder the ability of the core to perform its duty in a sandwich panel. The core must transfer shear stresses to the outer skins which resist the load, and to do this without causing stress concentrations within the core the high strength and low strength areas must be integral with one another. The effects of reinforcements are evidenced by premature buckling of the outer sheets and core in the area adjacent the filler. Another of the several disadvantages of this type of compressive strengthening is that filler reinforcements are difficult to insert properly whereby a predetermined design strength is practically impossible to meet. The panel disclosed by this invention eliminates those disadvantages and affords an economical method of making a panel which will conform to nearly any shape and strength requirement desired.

It is an object of this invention to provide a honeycomb panel having local areas which have high compressive strengths that compare favorably with the compressive strength of solid metal.

It is another object of this invention to disclose a honeycomb panel construction whereby structures may be joined by bolts or rivets without the use of inserts or filler blocks.

It is another object of this invention to set forth a simple panel construction in which the cross-sectional area of the honeycomb panel structure is varied.

It is another object of this invention to make a panel in such a manner as to reduce tooling and molding costs for honeycomb fabricated assemblies.

Another object of this invention is to make a panel which will protect the honeycomb core material from exposure and possible damage.

Further and other objects will become apparent from the accompanying description and drawing which form a part of this disclosure and in which like numerals refer to like parts.

In the drawing:

Figure 1 is a plan form view of a honeycomb panel wherein certain areas are compressed perpendicular to the plane of the panel.

Figure 2 is an enlarged sectional view taken on the line 2—2 in Figure 1 showing the cross-section of a compressed edge of the panel with a T beam riveted thereto.

Figure 3 is an enlarged sectional view taken on the line 3—3 in Figure 1 showing the cross-section of a compressed area within the panel.

Figure 4 is a cross-sectional view of the trailing edge portion of a thin wing airfoil.

Panel 1 shown in Figure 1 is constructed from metal honeycomb core material 2 and metal reinforcing skins 3 and 4 as shown in the drawing, securely bonded together to form a unitary structure. The edges of panel 1 are compressed as shown in Figure 2 by bending inner skin 3 toward outer skin 4 to greatly increase the compressive strength in those areas for connecting the panel to adjoining structure. Figures 1 and 2 show T-beam 5 secured by rivets 6 to one compressed edge of panel 1, illustrating a means for splicing to another panel or to a supporting structure.

To support a tube or some similar object (not shown) which extends through panel 1, the area around the opening is compressed as shown in Figure 3 and reinforced with a metal ring 7 secured by rivets 6 to panel 1 for resisting the applied load. This type of structure permits a more efficient design by increasing the strength of a panel locally in the critical areas without affecting the lightweight honeycomb panel in other areas.

The method of producing panel 1 applies to any type of sandwich construction where it is desirable to increase the local compressive strength as in Figures 1, 2 and 3 or where it is desirable to reduce the cross-sectional area as in the trailing edge of a thin wing shown in Figure 4. Skins 3 and 4 are laid out to conform to the desired plan form dimensions. Core 2, being of a desirable thickness, is then laid out, having the axes of the honeycomb hexagonal cells substantially perpendicular to the plane of the core, to conform to the plan form dimensions of skins 3 and 4. Core 2 is made of strips of metal foil two thousandths to six thousandths of an inch thick, formed and bonded together to form the multitude of hexagonal cells laid out as described. A thermosetting adhesive is then applied to the open celled surface of core 2 and to one surface of each of skins 3 and 4. Core 2 is then sandwiched between skins 3 and 4, having the thermosetting adhesive adjacent core 2. Sandwich constructed panel 1 is then placed in an oven where the adhesive is cured to effect a maximum bond between the core and skins. An external compressive force is then applied to panel 1 parallel to the cell axes of core 2 in the areas where greater compressive strength is required. Core 2 in those areas is thereby crushed as shown in the drawing. It is permissible and sometimes desirable to perform the curing and deforming operations simultaneously in cases where the thickness reduction is gradual as in Figure 4. Rivet holes 8 are drilled in the compressed areas of panel 1 for riveting the panel to other structure. To insure proper deformation of skin 3 during the compressing operation, the skin may be cut in the formed, curved bend-line areas which develop compound curvatures prior to the deformation, to eliminate wrinkling and to prevent overstressing the bond between the skin and core 2. Where the deformation is slight or when it produces a gradual change in thickness, this operation is not necessary.

This method of forming panel 1 provides a simple, effective way of controlling the thickness of honeycomb structures which will yield an increase in local compressive strength for resisting applied loads as well as to produce strong lightweight, thin sections like that shown in Figure 4.

Considerations such as skin thickness, core wall thickness, amount of deformation proposed, etc., may make it desirable to interchange crushing and bonding steps of the procedure. A very thin skin bonded to a heavy gauge core material prior to the deforming operation will, when the compressive deformation force is applied, result in the walls of the cells shearing through the skins. This situation is aggravated where the deformation occurs over a large area as in Figure 4. When it becomes necessary as a result of these conditions, core 2' is crushed to the desired shape prior to bonding skins 3' and 4' thereto. The crushing operation, whether before or after assembling the core and skins, is usually performed by use of dies. Where the extent of crushing substantially perpendicular to the call axes of core 2' is dependent upon the final shape, it may not be completely compressed as in the case where maximum compressive strength is desired. If the thickness variation of the resulting structure is large, and a portion thereof must necessarily be very thin, as for an airfoil, a trailing edge of which is shown in Figure 4, the core thickness prior to crushing, must be tapered so as not to have more core material than can be compressed to the desired minimum thickness. Core 2' in Figure 4 has been so tapered as evidenced by the substantially constant core deformation along the contoured edge. The very thin trailing edge would not have been attained had that portion of the core been as thick originally, as the portions inboard of the trailing edge.

It is to be noted that where, as described in conjunction with Figure 4, the core is crushed prior to or simultaneous with, its being bonded to the skins, the buckling or crushing deformation occurs primarily at the ends of the cell walls leaving the intermediate portion of the cell walls substantially unaffected. When the cell walls are restrained by being bonded to the skins before crushing as illustrated in Figures 1 and 3, where, as can be seen from the drawing, they collapse generally along their midportions. Note also that in Figure 4, the upper and lower skins 3' and 4' are formed from a single sheet bent as shown to provide an extremely thin but strong trailing edge.

It is to be understood that certain changes, alterations, modifications and substitutions can be made without departing from the spirit and scope of the appended claims.

I claim as my invention:

1. A sandwich panel construction of the type consisting of metal inner and outer surface sheets having intermediate metal foil honeycomb core bonded thereto in which the open-ended cells of the core extend normal to the surface sheets, said outer surface sheet being smooth and continuous, the inner surface sheet being bent toward the outer surface sheet forming a strip portion along the edge of said panel for attachment to other structure, said core intermediate said outer surface sheet and said formed inner sheet being crushed in accordance with the deformation of said inner sheet, said core between said inner and outer sheets at said strip portion being densified so that said strip portion affords a solid mass of metal for attachments.

2. A sandwich panel construction of the type consisting of metal inner and outer surface sheets having intermediate metal foil honeycomb core bonded thereto in which the open-ended cells of the core extend normal to the surface sheets, said outer surface sheet being smooth and continuous, the inner surface sheet being bent toward the outer surface sheet forming a strip portion along the edge of said panel for attachment to other structure, said core intermediate said outer surface sheet and said formed inner sheet being crushed as the inner sheet is bent conforming with the deformation of said inner sheet while adhering thereto, said core between said inner and outer sheets at said strip portion being densified so that said strip portion affords a solid mass of metal for attachments.

3. A sandwich panel construction of the type consisting of metal inner and outer surface sheets having intermediate metal foil honeycomb core bonded thereto in which the open-ended cells of the core extend normal to the surface sheets, said outer surface sheet being smooth and continuous, the inner surface sheet being bent toward the outer surface sheet forming an area for attachment of said panel to other structure, said core intermediate said outer sheet and said formed inner sheet being crushed in accordance with the deformation of said inner sheet, said core at said area between said inner and outer sheets being densified so that said area affords a solid mass of metal for attachments.

4. A sandwich panel construction of the type consisting of metal inner and outer surface sheets having intermediate metal foil honeycomb core bonded thereto in which the open-ended cells of the core extend normal to the surface sheets, said outer surface sheet being smooth and continuous, the inner surface sheet being bent toward the outer surface sheet forming an area for attachment of said panel to other structure, said core intermediate said outer sheet and said formed inner sheet being crushed as the inner sheet is bent conforming with the deformation of said inner sheet while adhering thereto, said core at said area between said inner and outer sheets being densified so that said area affords a solid mass of metal for attachments.

5. A sandwich panel construction of the type consisting of metal inner and outer surface sheets having intermediate metal foil honeycomb core bonded thereto in which the open-ended cells of the core extend normal to the surface sheets, an aperture formed in said panel, said outer surface sheet being smooth and continuous around said aperture, the inner surface sheet being bent toward the outer surface sheet forming a strip portion along the edge of said aperture for the attachment of other structure, said core intermediate said outer sheet and said formed inner sheet being crushed in accordance with the deformation of said inner sheet in the area of said aperture, said core between the inner and outer sheets at said strip portion around said aperture being densified so that the strip portion affords a solid mass of metal for attachments.

6. A sandwich panel construction of the type consisting of metal inner and outer surface sheets having intermediate metal foil honeycomb core bonded thereto in which the open-ended cells of the core extend normal to the surface sheets, an aperture formed in said panel, said outer surface sheet being smooth and continuous around said aperture, the inner surface sheet being bent toward the outer surface sheet forming a strip portion along the edge of said aperture for the attachment of other structure, said core intermediate said outer sheet and said formed inner sheet being crushed as the inner sheet is bent conforming with the deformation of said inner sheet while adhering thereto in the area of said aperture, said core between the inner and outer sheets at said strip portion around said aperture being densified so that the strip portion affords a solid mass of metal for attachments.

References Cited in the file of this patent

UNITED STATES PATENTS

| | | |
|---|---|---|
| 1,698,908 | Cleveland | Jan. 15, 1929 |
| 2,212,481 | Sendzimir | Aug. 20, 1940 |
| 2,371,847 | Saunders et al. | Mar. 20, 1945 |
| 2,428,979 | May | Oct. 14, 1947 |

FOREIGN PATENTS

| | | |
|---|---|---|
| 157,204 | Great Britain | Jan. 12, 1922 |